(12) United States Patent
Clinton et al.

(10) Patent No.: US 6,917,493 B2
(45) Date of Patent: Jul. 12, 2005

(54) AMPERE HEAD WITH PERPENDICULAR MAGNETIC FIELD

(75) Inventors: Thomas W. Clinton, Pittsburgh, PA (US); Jonathan D. Hannay, Pittsburgh, PA (US); Michael A. Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 123 days.

(21) Appl. No.: 10/341,975

(22) Filed: Jan. 14, 2003

(65) Prior Publication Data

US 2003/0142440 A1 Jul. 31, 2003

Related U.S. Application Data

(63) Continuation-in-part of application No. 10/084,033, filed on Feb. 27, 2002, now Pat. No. 6,665,136.
(60) Provisional application No. 60/315,467, filed on Aug. 28, 2001, and provisional application No. 60/386,770, filed on Jun. 6, 2002.

(51) Int. Cl.[7] .............................................. G11B 5/147
(52) U.S. Cl. ...................................................... 360/126
(58) Field of Search ................................. 360/119–127

(56) References Cited

U.S. PATENT DOCUMENTS

| | | | |
|---|---|---|---|
| 2,680,156 A | 6/1954 | Thorensen ............... 179/100.2 |
| 2,862,066 A | 11/1958 | Thiele ...................... 179/100.2 |
| 2,927,973 A | 3/1960 | Geller ...................... 179/100.2 |
| 3,475,739 A | 10/1969 | Manna et al. ............. 340/174.1 |
| 3,889,295 A | 6/1975 | Billawala .................... 360/123 |
| 4,001,890 A | 1/1977 | Kayser ........................ 360/121 |
| 4,191,982 A | 3/1980 | Wood et al. ................. 360/123 |
| 4,405,960 A | 9/1983 | Pick et al. .................. 360/125 |
| 4,631,612 A | 12/1986 | Shiiki et al. ................ 360/125 |
| 4,748,525 A | * 5/1988 | Perlov ......................... 360/110 |
| 4,763,215 A | 8/1988 | Gueugnon et al. ........... 360/119 |
| 4,771,350 A | 9/1988 | Desserre ...................... 360/123 |
| 5,239,425 A | 8/1993 | Kazama ........................ 360/59 |
| 5,251,082 A | 10/1993 | Elliott et al. |
| 5,434,831 A | 7/1995 | Ishii et al. ..................... 369/13 |
| 5,491,338 A | 2/1996 | Spitzer |
| 5,696,372 A | 12/1997 | Grober et al. ............... 250/216 |
| 5,815,343 A | 9/1998 | Ishikawa et al. .......... 360/97.01 |
| 6,278,679 B1 | 8/2001 | Weiss et al. ................. 369/108 |
| 2001/0027603 A1 | 10/2001 | Komuro et al. ........... 29/603.14 |

FOREIGN PATENT DOCUMENTS

| | | |
|---|---|---|
| DE | 1 023 603 | 1/1958 |
| DE | 1 088 728 | 9/1960 |
| DE | 3150322 A1 | 6/1983 |
| GB | 882779 | 11/1961 |

(Continued)

OTHER PUBLICATIONS

"Vertical Record/Read Magnetic Head", by T.A. Schwarz, *IBM Technical Disclosure Bulletin*, vol. 24, No. 8, Jan. 1982, p. 4034.

(Continued)

*Primary Examiner*—A. J. Heinz
(74) *Attorney, Agent, or Firm*—Robert P. Lenart, Esq.; Pietragallo, Bosick & Gordon

(57) ABSTRACT

A magnetic head for generating a magnetic field is provided in which first and second electrical contacts are electrically coupled to a thin film wire. An electrical current is passed between the contacts and through the wire to generate a magnetic field. A focus mechanism is provided to focus the magnetic field and thereby increase the flux density of the magnetic field along a recording edge of the thin film wire.

28 Claims, 16 Drawing Sheets

FOREIGN PATENT DOCUMENTS

| GB | 913068 | 12/1962 |
| JP | 57113406 | 7/1982 |
| JP | 60035318 A | 2/1985 |
| JP | 02294903 | 12/1990 |

OTHER PUBLICATIONS

"Currents and Fields in a Superconducting Film Carrying a Steady Current", by P. Marcus, *Proc. Seventh Intern. Conf. Low Temp. Phys.*, (University Press, Toronto, 1961), pp. 418–421.

"Electricity, Magnetism, and Light", by R. Blum et al., *Physics, Volume Two*, 1982, pp. 1194–1195 and 1212.

"Theory of Magnetic Recording", by H.N. Bertram, *Cambridge University Press*, 1994, pp. 56–63.

"Current–Induced Switching of Domains in Magnetic Multilayer Devices", by E.B. Myers et al., *Science*, vol. 285, Aug. 6, 1999, pp. 867–870.

"Current–Driven Magnetization Reversal and Spin–Wave Excitations in Co/Cu/Co Pillars", by J.A. Katine et al., *The American Physical Society*, vol. 84, No. 14, Apr. 3, 2000, pp. 3149–3152.

"Reliability and Current Carrying Capacity of Carbon Nanotubes", by B.Q. Wei et al., *Applied Physics Letters*, vol. 79, No. 8, Aug. 20, 2001, pp. 1172–1174.

*Patent Abstracts of Japan*, vol. 004, No. 039 (P–004), Mar. 28, 1980 & JP55012523A (Fujitsu Ltd.), Jan. 29, 1980 abstract.

*Patent Abstracts of Japan*, vol. 009, No. 157 (P–369), Jul. 2, 1985 & JP 60035318A (Toshiba KK), Feb. 23, 1985 abstract.

* cited by examiner

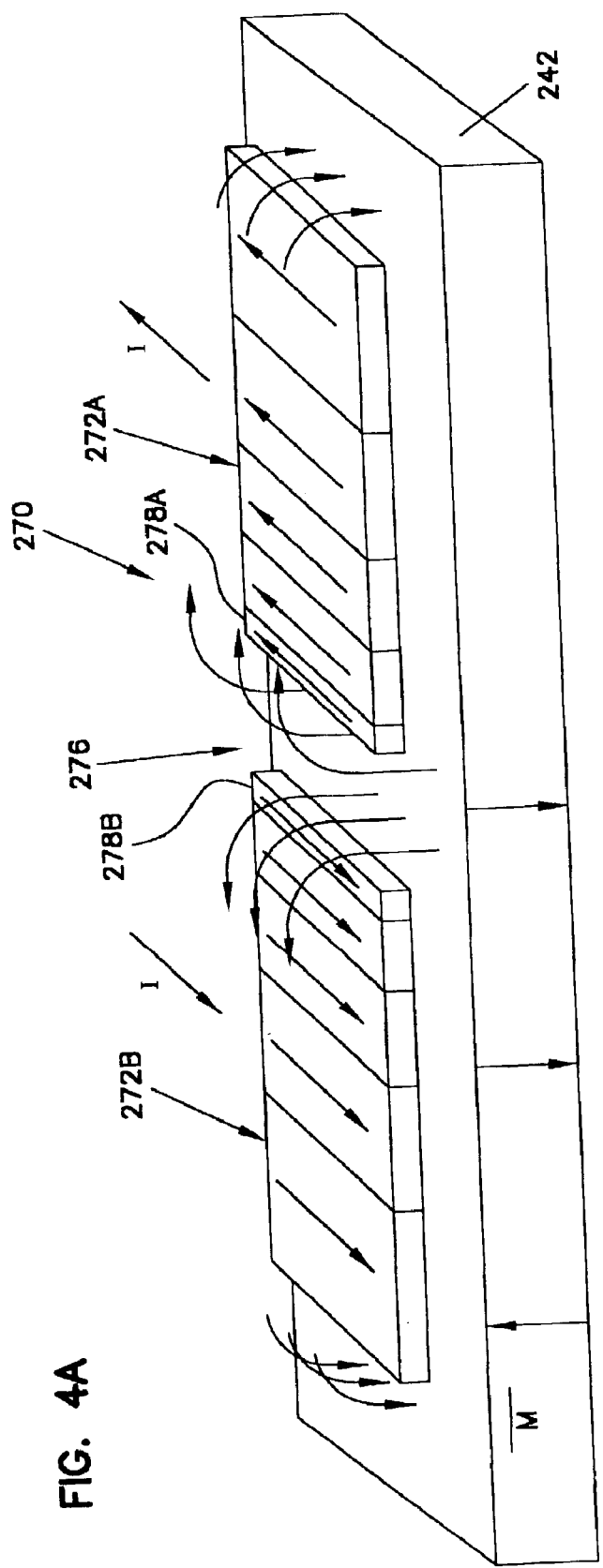

US 6,917,493 B2

AMPERE HEAD WITH PERPENDICULAR MAGNETIC FIELD

CROSS-REFERENCE TO RELATED APPLICATION

This application is a continuation-in-part of U.S. patent application Ser. No. 10/084,033 entitled RECORDING HEADS USING MAGNETIC FIELDS GENERATED LOCALLY FROM HIGH CURRENT DENSITIES IN A THIN FILM WIRE, filed Feb. 27, 2002 now U.S. Pat. No. 6,665,136 which claims the benefit of U.S. Provisional Ser. No. 60/315,467, filed Aug. 28, 2001 and claims priority from U.S. Provisional Application 60/386,770 filed on Jun. 6, 2002 for inventors Thomas W. Clinton, Jonathan D. Hannay and Michael A. Seigler and entitled A MAGNETIC FIELD PROFILE OF AMPERE HEAD.

FIELD OF THE INVENTION

The present invention relates to recording heads for use with magnetic storage systems. More particularly, the present invention relates to an ampere head configured for perpendicular recording.

BACKGROUND OF THE INVENTION

Magnetic storage systems are used to magnetically store information. In such a system, the direction of a magnetic field in a magnetic storage medium is altered to form a pattern representative of stored information.

There are two general techniques for magnetically recording information on a storage medium. One technique, known as "longitudinal" recording, has found widespread use. In longitudinal recording, the direction of the magnetic field in a plane of the storage medium is altered in a manner to store information. Another technique is known as "perpendicular" recording. In perpendicular recording, the magnetic field is impressed into the storage medium in a direction which is perpendicular to the plane of the medium. With the magnetic field direction perpendicular to the plane of the medium as opposed to parallel with the plane, information can be stored at higher density.

There has been an ongoing effort to increase the bit densities in magnetic recording. Bit density refers to the number of flux reversals (i.e. changes in the direction of a magnetic field) which can be written to the storage medium in a given area. The size of such a flux transition is related to the size and focus of a magnetic write field generated by a magnetic head. One traditional type of magnetic head is known as an inductive head which uses a current passed through a coil of wire. This causes a magnetic field to be generated across a gap formed between two pole tips.

There is also an ongoing effort to use magnetic storage medium which has a high coercivity. Such medium require stronger and more focused write field to impress a flux reversal. With the inductive head designs, it is difficult to obtain a tightly focused magnetic field with a sufficiently high field strength to write data perpendicularly to such a medium at ever increasing bit densities.

The present invention provides a solution to these and other problems and offers advantages over the prior art.

SUMMARY OF THE INVENTION

The present invention relates to data storage systems and apparatus, such as disc drive data storage systems, which include heads for magnetically writing data onto a surface of a storage medium. The invention also relates in general to devices for producing a magnetic field.

In accordance with one embodiment of the invention, a magnetic head for generating a magnetic field is provided in which first and second electrical contacts are electrically coupled to a thin film wire. An electrical current is passed between the contacts and through the wire to generate a magnetic field. A focus mechanism is provided to focus the magnetic field and thereby increase the flux density of the magnetic field along a recording edge of the thin film wire.

BRIEF DESCRIPTION OF THE DRAWINGS

FIG. 4A is a perspective view of two adjacent multi-layer thin film wires.

DETAILED DESCRIPTION OF ILLUSTRATIVE EMBODIMENTS

Figure 1:
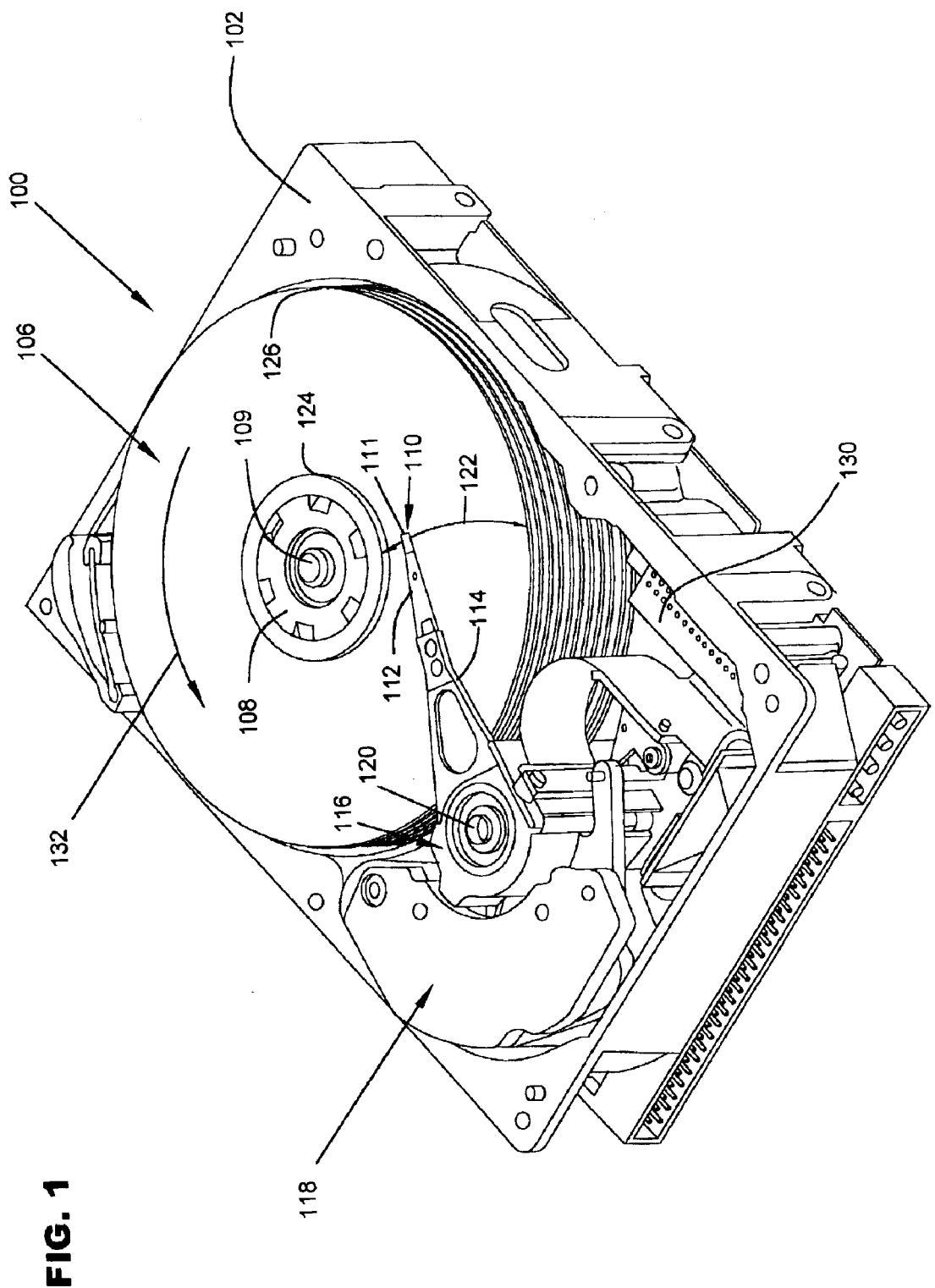
FIG. 1 is a perspective view of a disc storage system for use with a magnetic head of the present invention.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs (storage media), which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). Head assembly 110 includes a "slider" which carries a magnetic head (not shown in FIG. 1) for perpendicular recording onto a surface of a disc.

As bit-areal densities in magnetic recording continue to progress in an effort to increase the storage capacity of hard disc drives, magnetic transition (bit) dimensions and, concomitantly, recording head critical features are being pushed below 100 nm. In a parallel effort, magnetically harder (high coercivity) medium materials are preferably used to provide a stable recording medium at higher areal densities. Traditionally, writing to a harder medium has been achieved by increasing the saturation magnetization, or $4\pi M_s$ value, of the magnetic material of the inductive write head, thus bolstering the magnetic field applied to the medium. Though there has been some success in materials research efforts to increase $M_s$ of the write head, the rate of increase is not significant enough to sustain a significant growth rate of bit areal densities in disc storage. A parallel effort to write to progressively harder medium is to locally reduce the coercivity of the medium during the writing process. Typically, this is accomplished by locally heating the medium (by optical, or, more generally, electromagnetic stimulation) to lower its temperature-dependent coercivity during the writing process. This technique has thus far been limited to laboratory demonstrations and requires numerous technological advances in both head design and disc materials. Accordingly, there is a need for a recording head that is capable of overcoming the coercivity of a magnetic medium appropriate for the next generation, and beyond, in recording technology, which has the benefit of manufacturability.

An ampere head is a recording head which can record data using magnetic fields generated locally from high current densities in a thin film wire. The spatial profile of the magnetic field generated by such a head is critical to the head performance.

Figure 2A:
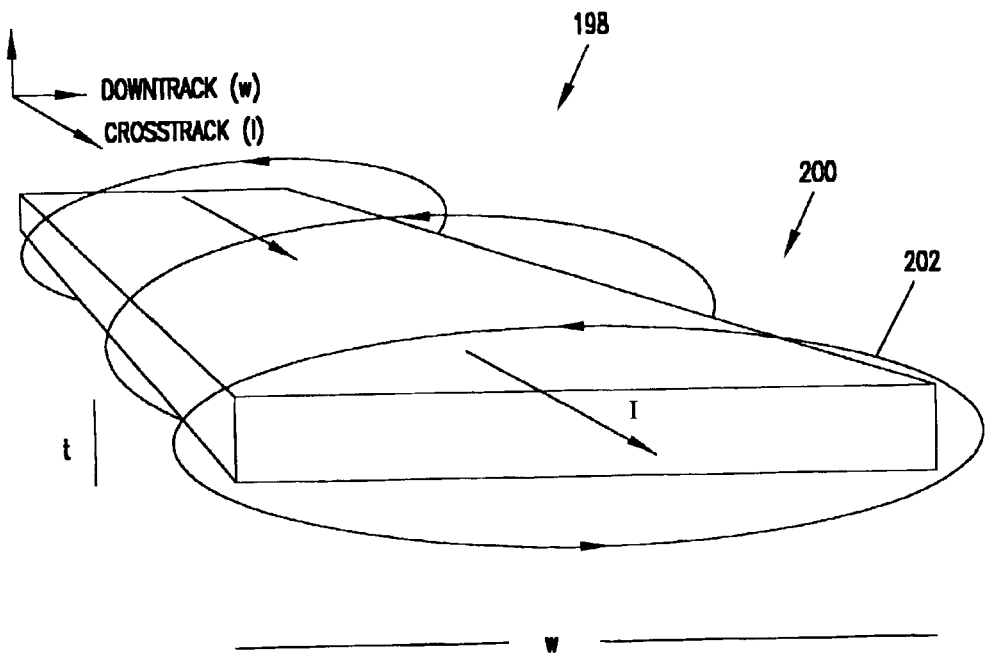
FIG. 2A is a perspective view of a thin film wire ampere head writer.
Figure 2B:
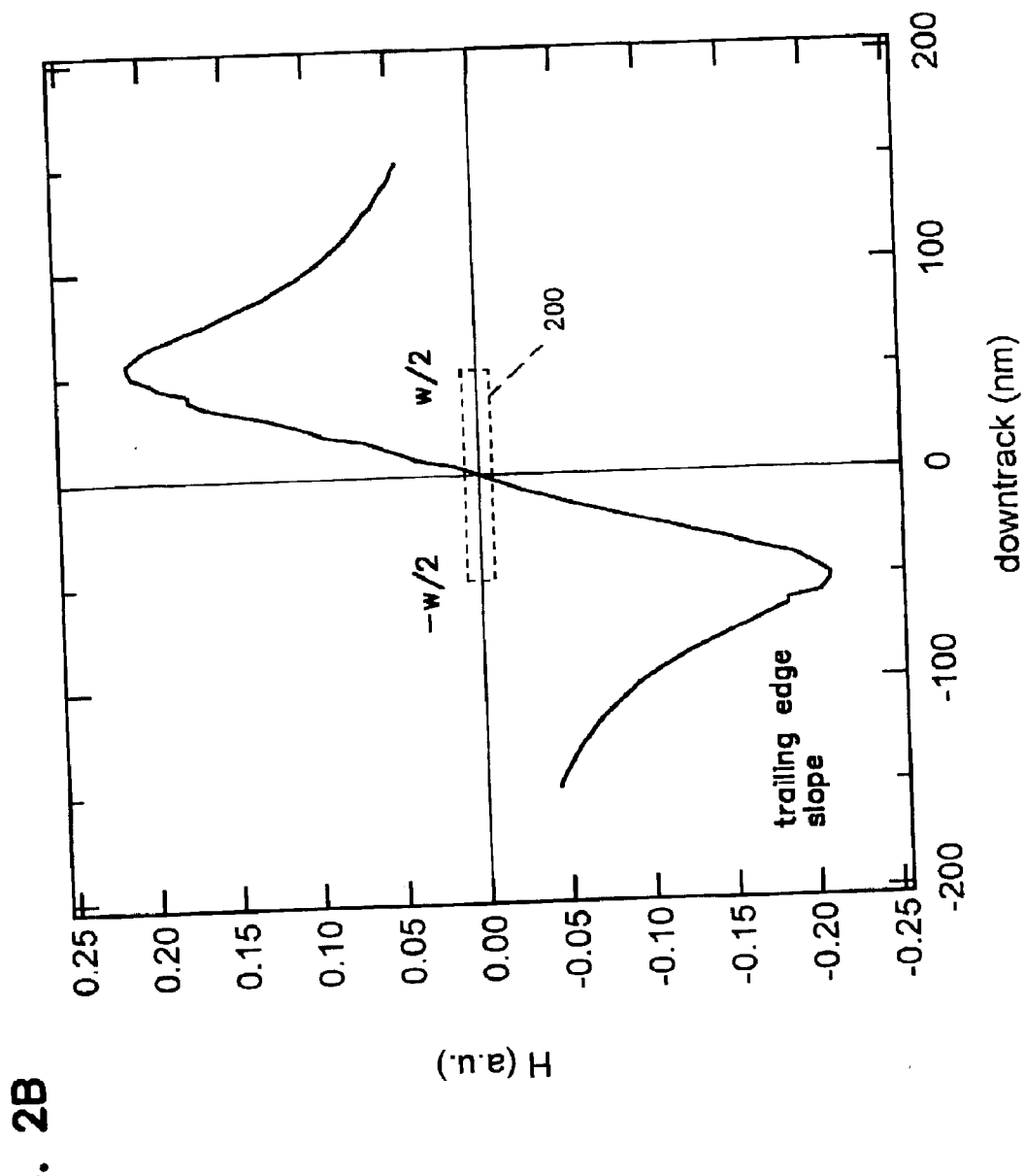
FIG. 2B is a graph of magnetic field vs. position for the thin film wire of FIG. 2B.

FIG. 2A is a perspective view of an ampere head 198 formed by an elongate thin film wire 200 having a width w and a thickness t. A current I is carried through the wire 200 which generates a magnetic field 202. Arrows show the downtrack and crosstrack directions relative to the head 200. FIG. 2B is a graph of magnetic field strength H (a.u.) vs. downtrack position and shows FEM modeling data of the downtrack perpendicular field profile (at track/wire center) for thin film current carrying wire 200 having dimensions of 100 nm wide (downtrack), 100 nm long (crosstrack), and 5 nm thick (perpendicular to the air bearing surface ABS) measured at track center, and at a distance of 20 nm away from the wire surface (ABS). The field profile has its maximum gradient between the positive and negative peak values (peak-to-peak slope), approximately between the points defining +w/2 and −w/2, respectively. For example, the slopes of the trailing- or leading-edge field profiles (trailing- or leading-edge slopes in FIG. 2B) are less than half the peak-to-peak slope over the same range.

The field gradient is used for writing the sharpest possible magnetic transitions in the recording medium. The ideal field profile for writing should have the peak field magnitude followed by the sharpest gradient extending to an effectively small field magnitude i.e. the gradient should be framed by the peak field and an effectively small field. However, as illustrated in FIG. 2B, two peak fields of equal magnitude frame the maximum gradient. Because these peaks are of equal magnitude, the peak which is not intended to write will interfere with data recorded on the storage medium and cause errors to be written in.

Figure 3A:
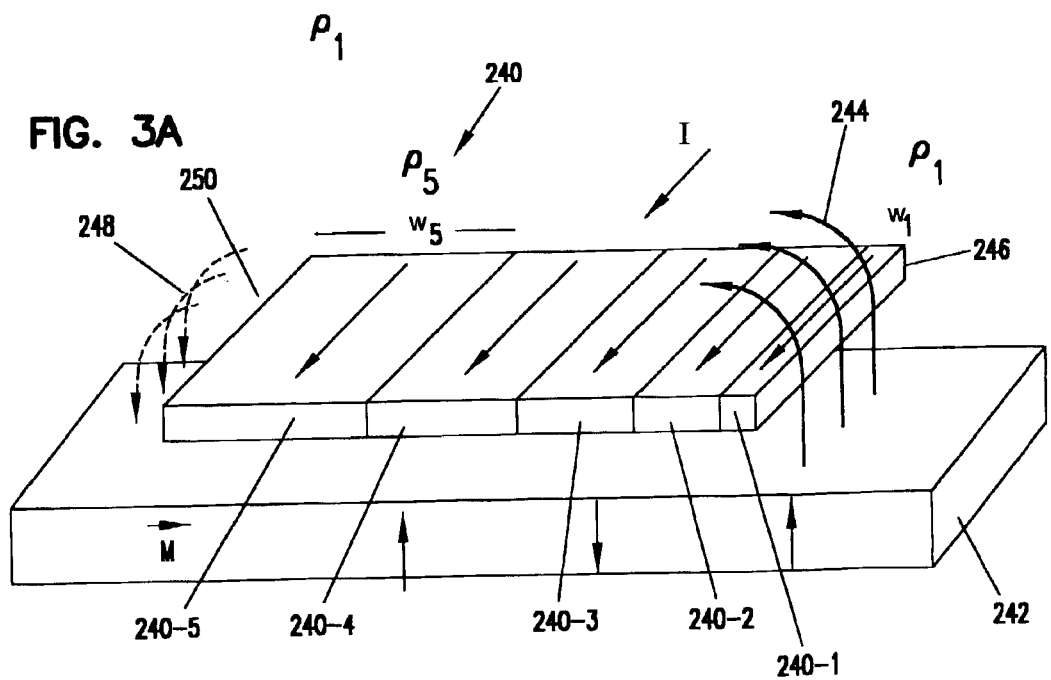
FIG. 3A is a perspective view of a multi-layer thin film wire.

FIG. 3A is a perspective view of an ampere head 240 which illustrates one example embodiment of the present invention. Ampere head 240 comprises a multi-layered thin film wire comprising layers 240-1, 240-2, 240-3, 240-4 and 240-5. This multi-layer wire structure has varying wire widths and resistivity to generate the perpendicular magnetic field profile shown by the dark line in the graph of field strength vs. downtrack position of FIG. 3B.

In FIG. 3A, a current I is passed through wire 240. Wire layers 240-1 through 240-5 have respective widths $w_1$ through $w_5$. Current density is controlled, by controlling the resistivity of the layer such that layer 240-1 has a higher current density than 240-2, which in turn has a higher density than wire 240-3 which itself in turn has a higher current density than wire 240-4, which in turn has a higher current density than wire 240-5. In general, the current density in a given layer can be readily controlled by the resistivity of the layer, such that higher current densities are achieved with lower resistivity material, as the multilayer acts as a current divider where the current in each layer is dictated by the layer resistance. The design shown in FIG. 3A has the narrowest wire width and the lowest resistivity material at the recording edge, and the width increases and the resistivity increases for each subsequent layer back to the trailing edge. This creates a current-density gradient across the width of the wire which is largest at the recording edge and smallest at the trailing edge. As an example, Table 1 shows normalized parameters for such a configuration. The range over which the parameters need be varied is typically not much more than an order of magnitude. Such a configuration can be easily fabricated.

TABLE 1

|  | wire layer 240-1 | wire layer 240-2 | wire layer 240-3 | wire layer 240-4 | wire layer 240-5 |
| --- | --- | --- | --- | --- | --- |
| Normalized width, w | 1 | 1.7 | 2.2 | 3 | 4 |
| Normalized current, I | 1 | 0.6 | 0.47 | 0.4 | 0.33 |
| Normalized current density, J | 1 | 0.35 | 0.21 | 0.133 | 0.083 |
| Normalized resistance, R | 1 | 1.67 | 2.14 | 2.5 | 3 |
| Normalized resistivity, ρ | 1 | 2.83 | 4.71 | 7.5 | 12 |

Although other dimensions can be employed, in one specific example the width of wire 240-1 is 50 nm, 240-2 is 85 nm, 240-3 is 110 nm, 240-4 is 150 nm and 240-5 is 200 nm with a length of 50 nm and a thickness of 10 nm. Such a configuration provides for areal recording densities of more than 100 Gbit/in$^2$.

Figure 3B:
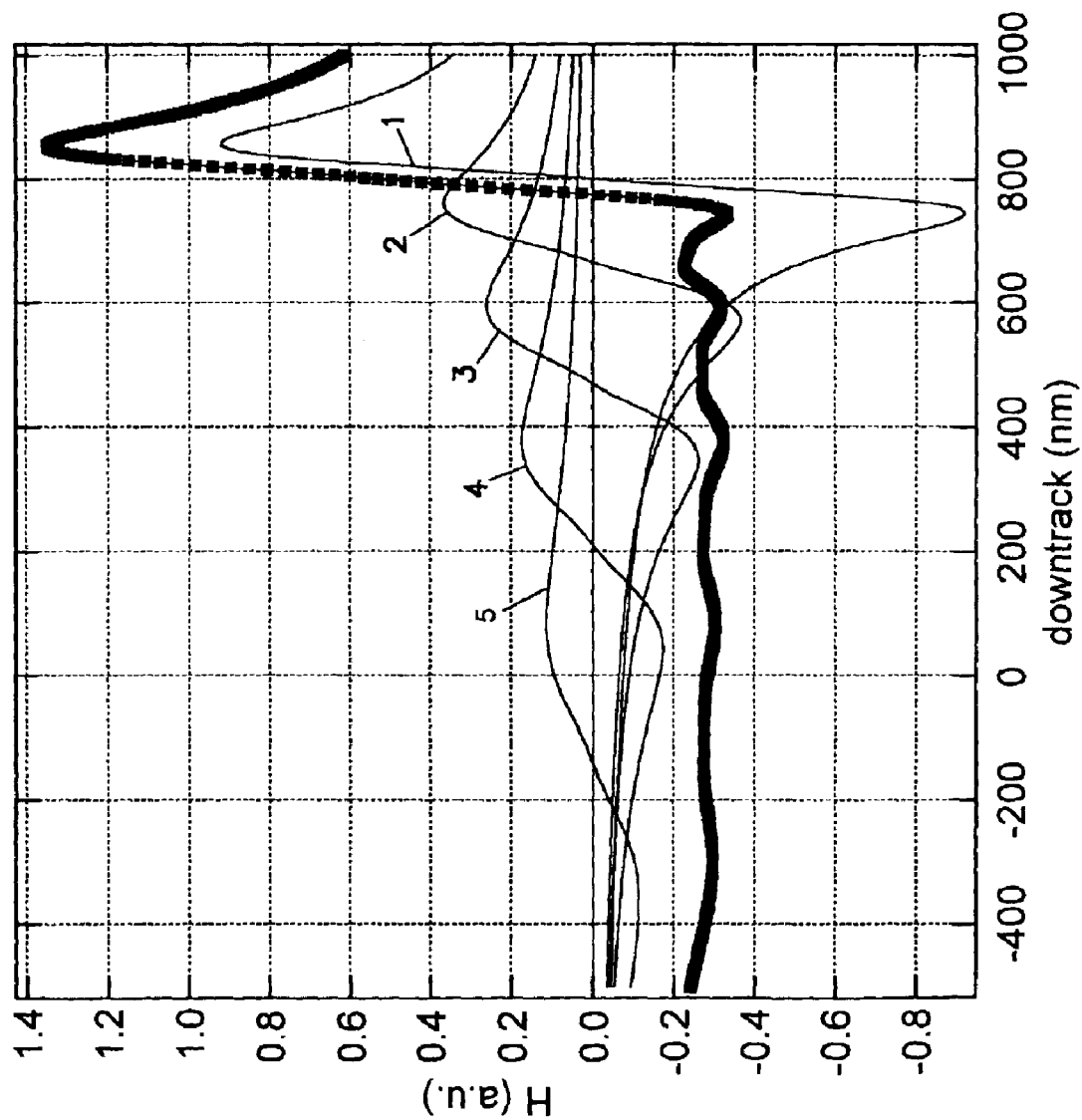
FIG. 3B is a graph of magnetic field vs. position for the layers of the thin film wire of FIG. 3A.

In FIG. 3A, wire 240 is shown adjacent recording medium 242. The configuration of the present invention provides an increased magnetic flux density as illustrated by flux lines 244 in the region of a recording edge 246 in comparison to the flux density of flux lines 248 near a trailing edge 250. FIG. 3B is a graph of magnetic field versus a position for wire 240-1 through 240-5 of FIG. 3A along with the field from the composite multilayer wire 240. As illustrated in FIG. 3B, the net magnetic field profile for wire 240 is the linear superposition of the fields from the individual wires which make up the multilayer. The perpendicular field profile from each wire layer is also plotted in FIG. 3B. The field contributions from each layer add constructively at the recording edge 246, effectively focusing the field on edge 246, while the fields at the trailing edges 250 add destructively to zero (at least to an effectively small field magnitude). Magnetic recording using this configuration is schematically depicted in FIG. 3A where the magnetic transitions are written to the recording medium 242 by the fields generated at the recording edge 246 of the head 240. In this model, a five-layer structure of equal thicknesses and lengths is used and with no spacing between layers. However, the invention includes any suitable configuration and is not limited to this particular embodiment.

Figure 3C:
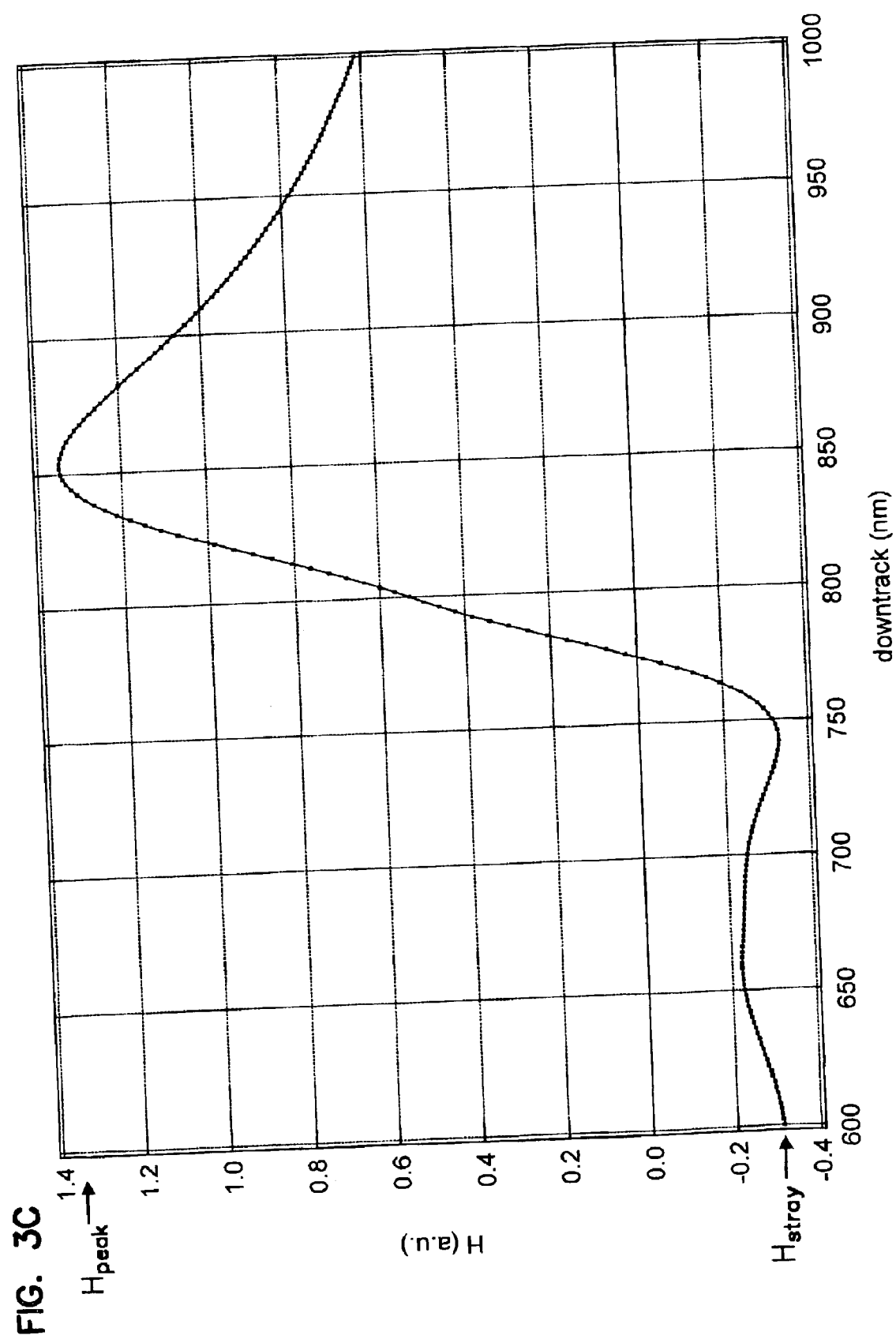
FIG. 3C is a graph of magnetic field vs. position for the thin film wire of FIG. 3A.

FIG. 3C is a more detailed view of the magnetic field versus position for the multilayer ampere head 240 of FIG. 3A. FIG. 3G illustrates the peak magnetic field ($H_{peak}$) at the recording edge 246 and the stray magnetic field ($H_{stray}$) at the trailing edge 250. Preferably, $H_{peak}$ is greater than the media closure field and $H_{stray}$ is less than the media nucleation field. For example, $H_{stray}$ can be less than about 30% of $H_{peak}$. Further, there is preferably a large field gradient between $H_{peak}$ and $H_{stray}$. In FIG. 3C, the trailing edge field magnitude is less than 25% of the peak field at the recording edge, which is appropriate for magnetic recording. This value can be made smaller or larger depending on the needs of the recording system, and is a strong function of the number of wire layers, wire dimensions, spacing between wires, and resistivity of each layer.

In general, the perpendicular field profile, including peak field magnitude, field gradient, and trailing edge field can all be controlled using the adjustable design parameters of current, number of wire layers, wire dimensions of each layer, spacing between each wire layer, and resistivity of each layer. The modeled structures described herein are design examples, and are by no means exhaustive of this parameter space, but are intended to demonstrate the operation of the invention. These designs can be readily fabricated using techniques common to the field. In a typical head build at the wafer level, the multilayer wire can be fabricated by depositing a multilayer thin film, with each film layer acting as a wire layer as described above. The wire width (downtrack direction) as defined herein is dictated by the thin film thickness, making it straightforward to vary the individual wire width with atomic accuracy. The wire spacing, if desired, can also be independently varied in the same way using thin film deposition thickness of an appropriate spacer layer to control the spacing between layers. As mentioned above, a spacer layer can be used as an adjustable parameter in achieving the desired field profile. It may also be desirable to have a non-zero thickness (film growth direction, downtrack) spacer material to prevent material migration between the different wire layers. Standard wafer-level processing techniques can be used to define wire length (crosstrack direction), while a lapping process can define wire thickness (perpendicular to ABS). In this model the same wire length and thickness are used throughout the multilayer, which is the most straightforward design from a processing standpoint and leads to a desirable field profile for recording purposes. The resistivity of a wire layer can be independently varied by varying the material or material properties of each layer as necessary to achieve desired resistance, thermal conductance, etc., using techniques commonly known in the field.

Figure 4B:
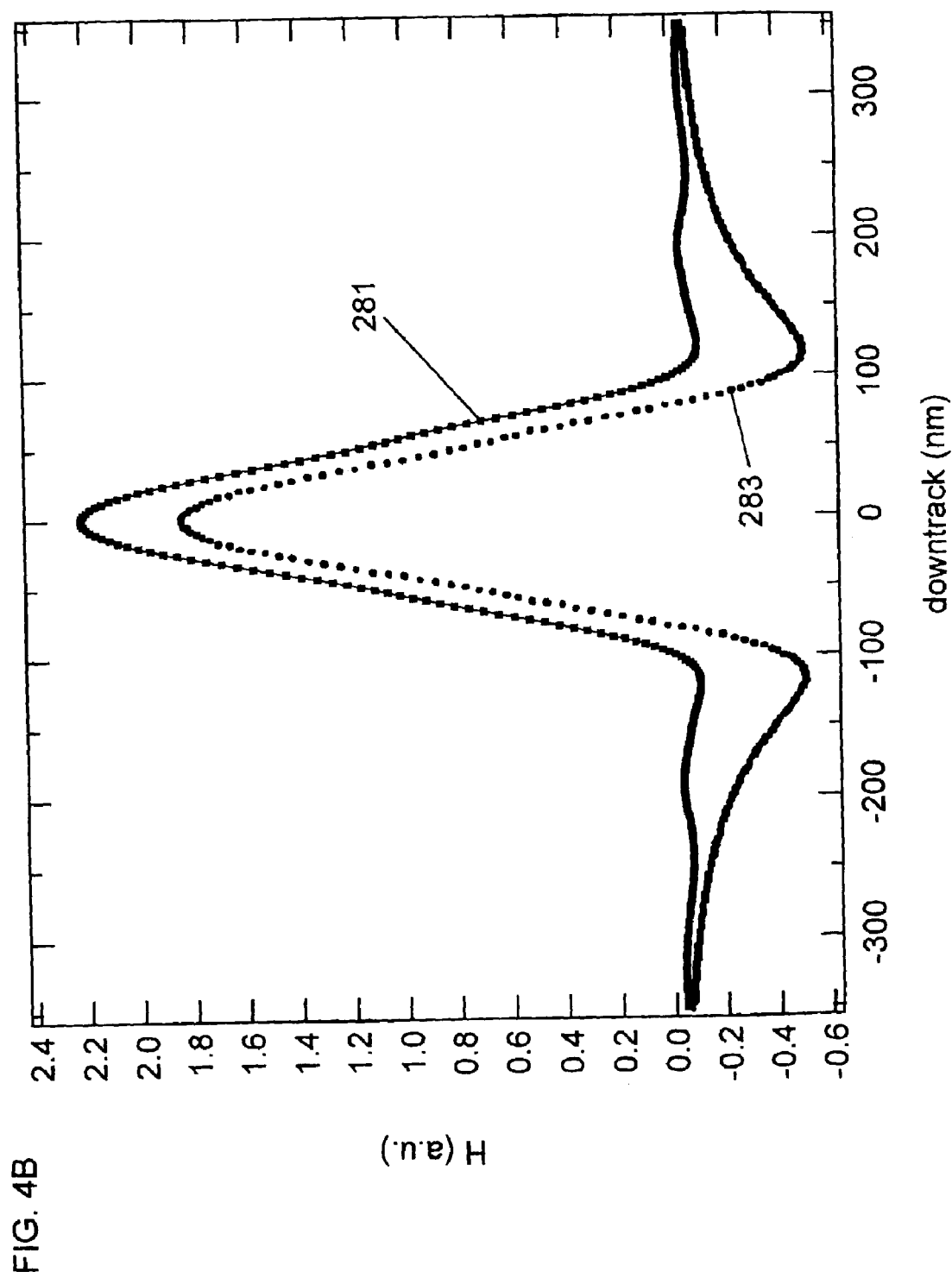
FIG. 4B is a graph of magnetic field vs. position for the multi-layer thin film wires of FIG. 4A.

FIG. 4A is a perspective view of a magnetic head 270 including two opposed thin film wires 272A and 272B which lie in the same plane proximate magnetic storage medium 242. Wires 272A and 272B are separated by a space 276 with their high current density regions which form recording edges 278A and 278B positioned near the space 276. This causes a region of high flux density in the center of the gap as illustrated in the graph of FIG. 4B. FIG. 4B is a graph of magnetic field versus position for head 270 in which the downtrack perpendicular field profile for a pair of multilayer wires (graph 281) is contrasted with that of a pair of single layer wires (graph 283). The peak field magnitude occurs at a point along the downtrack direction between the pair of wires, and away from this point the field falls off rapidly, where the profile is symmetric about the origin for both structures. The present invention focuses the field at the origin. The ratio of peak field to background field, in this example of a five layer wire pair, is about an order of magnitude larger than that of the single-layer wire pair.

Figure 5B:
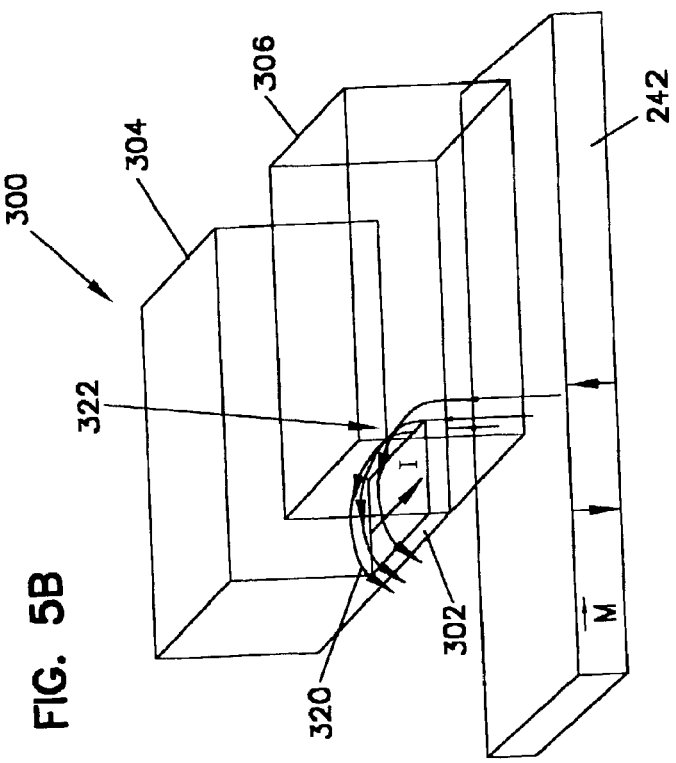
FIGS. 5A and 5D are bottom perspective views and FIG. 5B is a top perspective view of a thin film wire coupled to electrical contacts in a manner to provide a focused magnetic field.
Figure 5A:
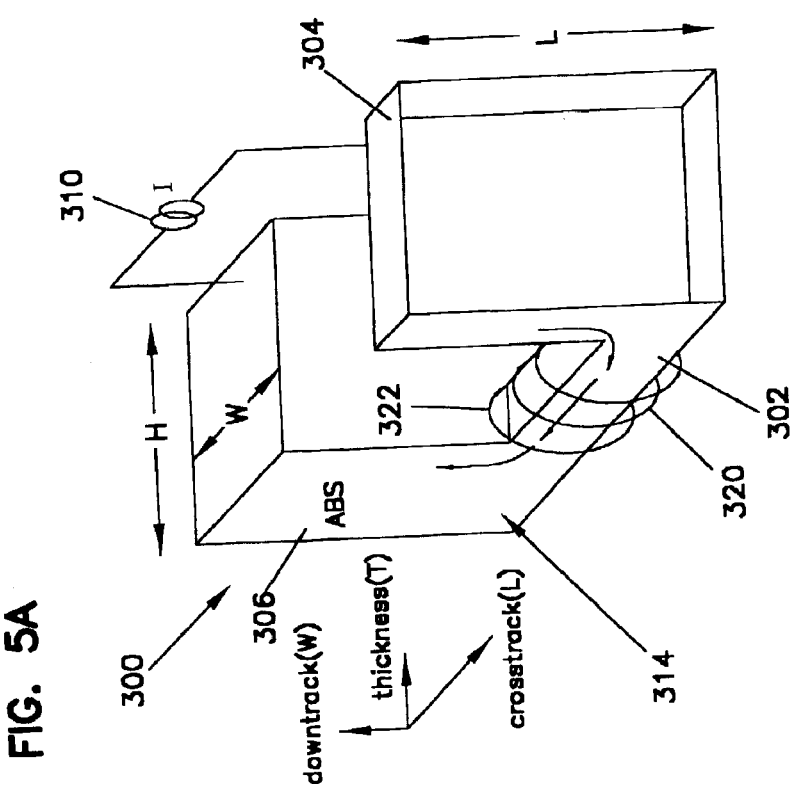

Another aspect of the present invention includes the use of contact geometry to focus the magnetic field. An example of contact geometry is schematically depicted in FIGS. 5A and 5B for a single-layer wire head 300. FIG. 5A is a bottom perspective view and FIG. 5B is a top perspective view of head 300 which includes thin film wire 302 electrically coupled to electrical contacts/heat sinks 304 and 306. A current source 310 is shown in FIG. 5A coupled between contacts 304 and 306 which provides an electrical current I through wire 302. Contacts 304 and 306 can comprise any appropriate material such as copper. In one specific embodiment the contacts have a height H of 300 nm, a width W of 500 nm and a length L of 750 nm. An air bearing surface (ABS) 314 of head 300 is configured to face magnetic storage medium 242 as illustrated in FIG. 5B. In FIG. 5B contact 306 is shown in phantom so that the complete structure can be seen.

Figure 5C:
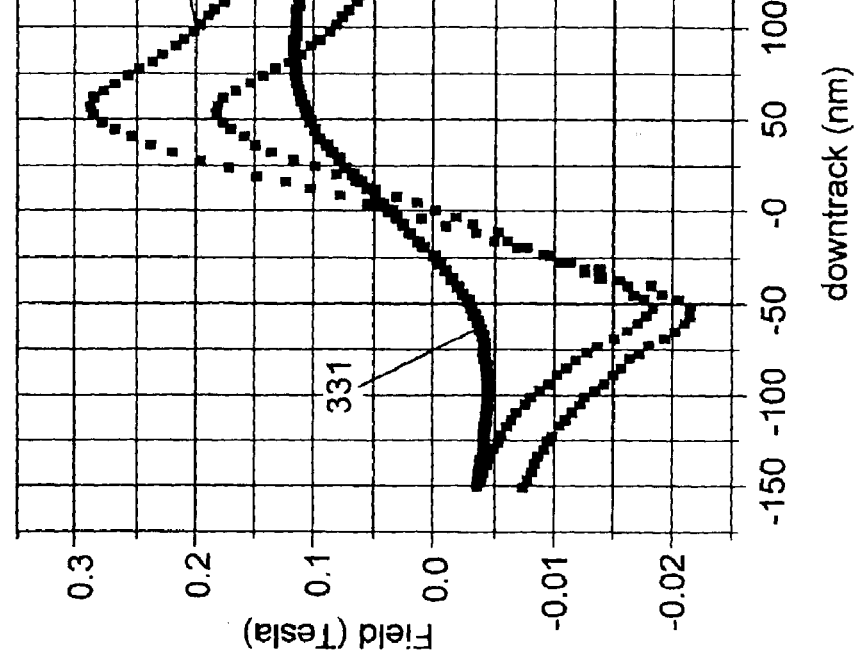
FIGS. 5C and 5E are graphs of magnetic field vs. position for the magnetic heads of FIGS. 5A and 5D.

The contact geometry shown in FIGS. 5A and 5B focuses the magnetic field along the recording edge 322 of the wire 302 which is imposed by the contacts 304 and 306. The current I follows a path through conductors 304 and 306 and thin film wire 302 to focus magnetic flux 320 along a recording edge 322 of wire 302. FIG. 5C is a graph of field-strength versus position for electrical contacts alone (graph 331), the thin film wire alone (graph 333) and the contact and thin film wire when combined (graph 335). As illustrated in FIG. 5C, the perpendicular magnetic field generated by the wire about the center is symmetric. However, the electrical contacts have an asymmetric field which, when combined with the field from the wire, provides a desirable asymmetric field strength distribution. This effect can also be obtained, although less pronounced, when the wire is not positioned at the ends of the electrical contacts.

Figure 5E:
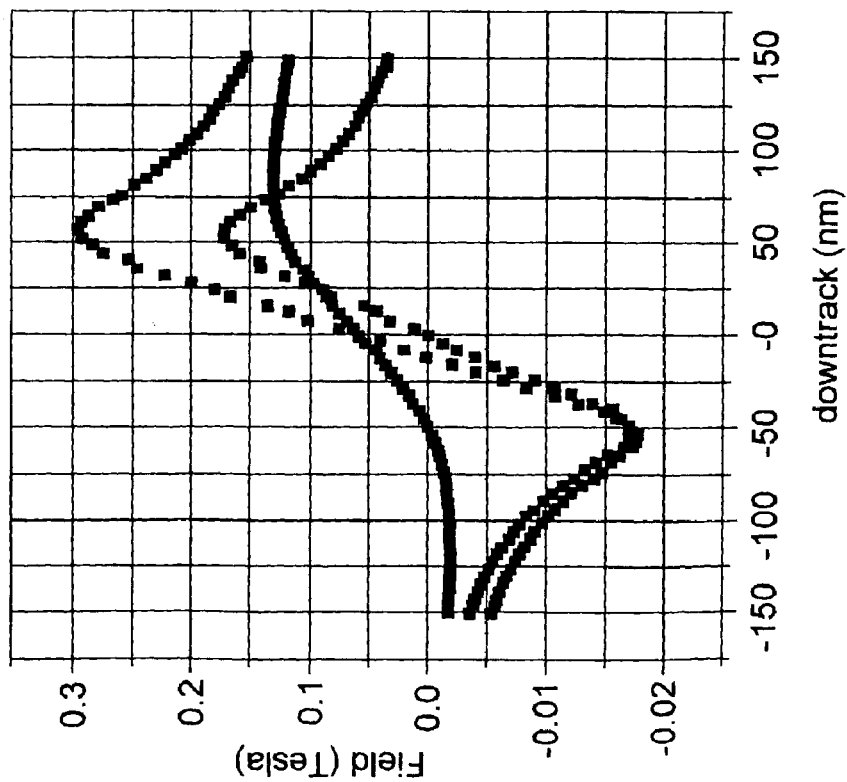
Figure 5D:
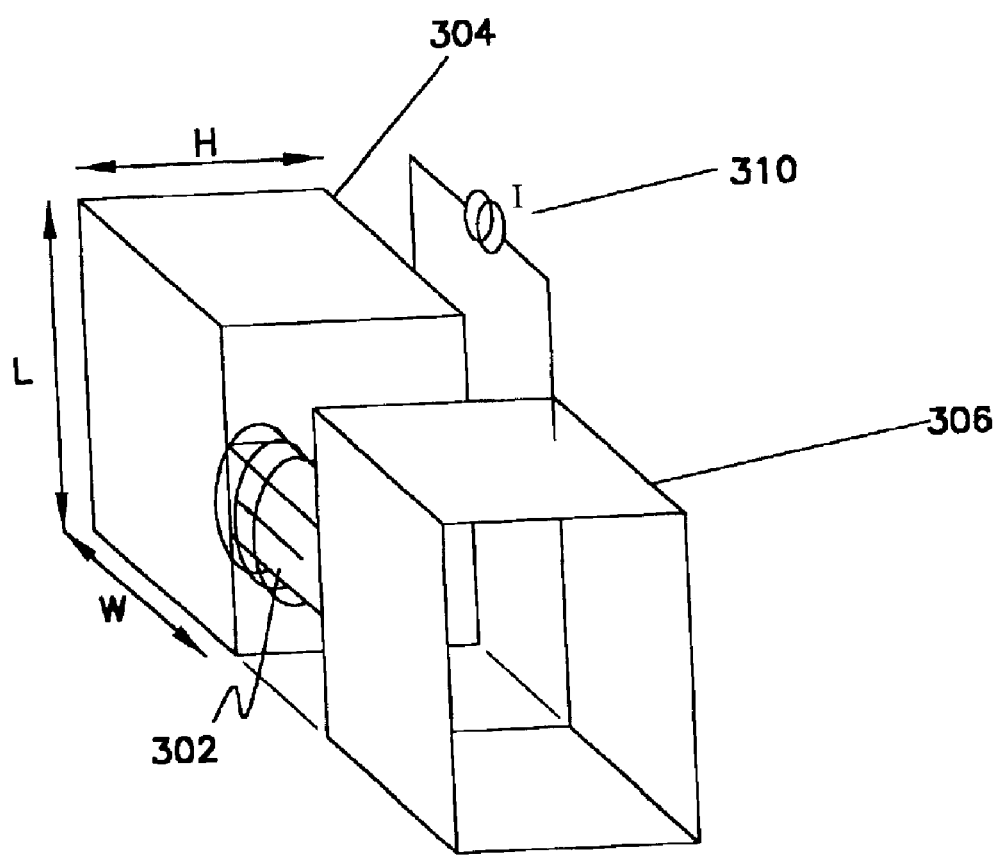

FIGS. 5D and 5E are similar to FIGS. 5A and 5C and illustrate an embodiment in which the wire 302 is spaced apart from the ends of contacts 304 and 306. This configuration also yields an asymmetric net field profile. This asymmetry focuses the field on one edge of the wire which can be designated the "recording" edge.

Figure 6A:
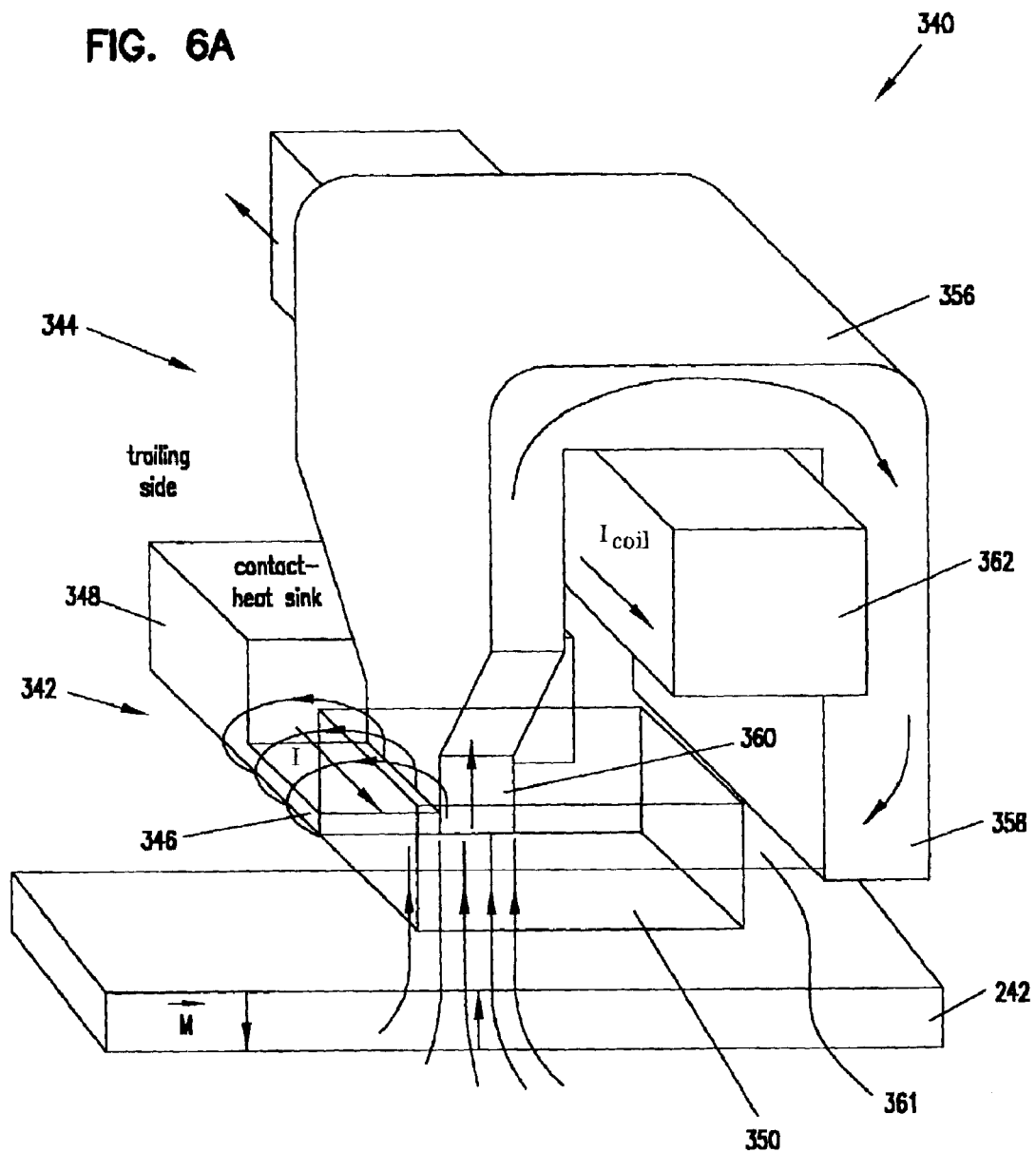
FIG. 6A is a perspective view of a magnetic head which includes a thin film wire and an inductive head.

FIG. 6A is a perspective view of an integrated magnetic head 340 which includes an ampere head 342 and an inductive head 344 combined to augment the resultant magnetic field. In general, a ferromagnetic material can be placed adjacent the ampere head 342 to augment the magnetic field. Ampere head 342 includes single layer thin film wire 346 coupled to electrical contacts 348 and 350. Inductive head 344 includes a magnetic core 356 having poles 358 and 360 and an electrical coil 362 extending therethrough. A gap 361 is defined between poles 358 and 360 across which a magnetic field emenates. The magnetic fields from the two heads 342 and 344 add constructively for perpendicular recording in medium 242. Of course, a multilayer wire can also be used.

Figure 6B:
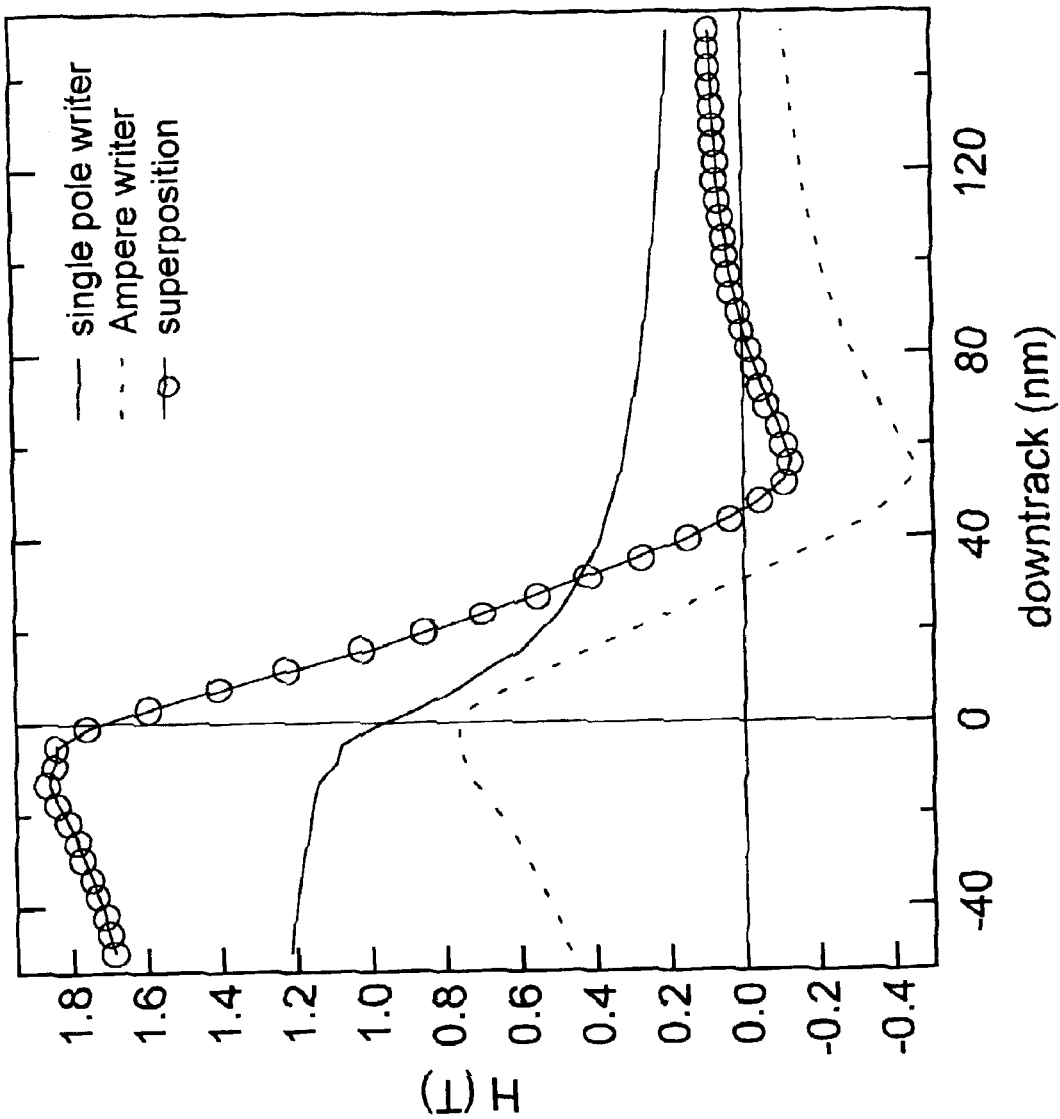
FIG. 6B is a graph of magnetic field vs. downtrack position for the magnetic head of FIG. 6A.

FIG. 6B is a graph of magnetic field versus position and FIG. 6G is a graph of normalized magnetic field versus position for the inductive head (graph 351), ampere head (graph 353), and their superposition (graph 355) for the head 340 of FIG. 6A. FIG. 6B shows the perpendicular field at track center as a function of downtrack position measured at a spacing of 10 nm from the air bearing surface (ABS) of head 340 and incorporating a soft underlayer (SUL). The single-layer wire 346 has dimensions of 50 nm wide (downtrack), 50 nm long (crosstrack), and 4 nm thick, carrying 80 mA at a current density of $4 \times 10^{10}$ A/cm$^2$. The single pole inductive writer also has a 50 nm crosstrack dimension, the pole material has a saturation magnetization of $4\pi M=2.0$ T, and the pole is near saturation in the model. The three traces in each figure correspond to the field from the wire structure (contacts and wire, ampere head) (graph 353), the field from the single-pole writer (graph 351), and their linear superposition (graph 355).

Figure 7A:
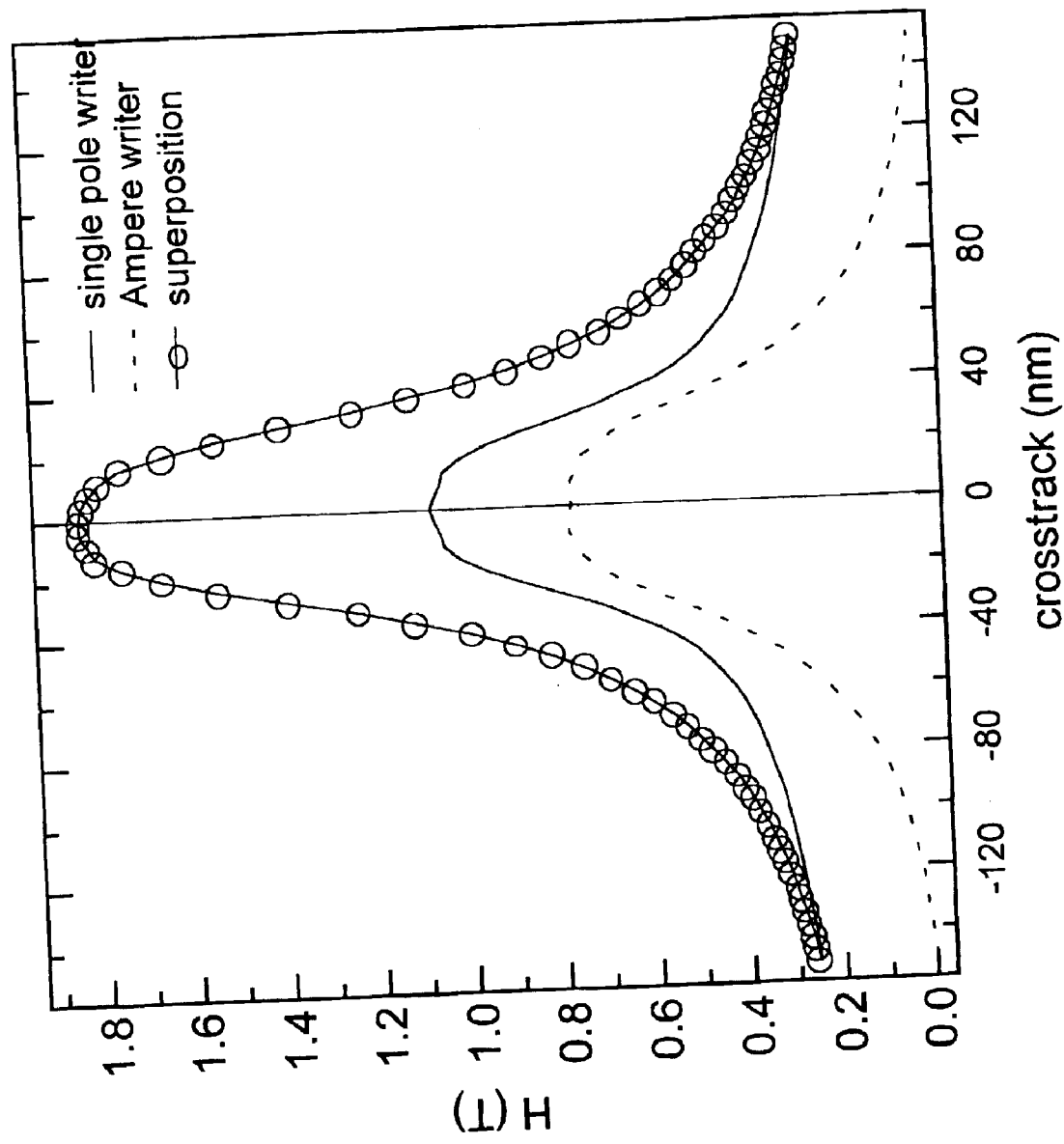
FIG. 7A is a graph of magnetic field vs. crosstrack position for the magnetic head of FIG. 6A.
Figure 7B:
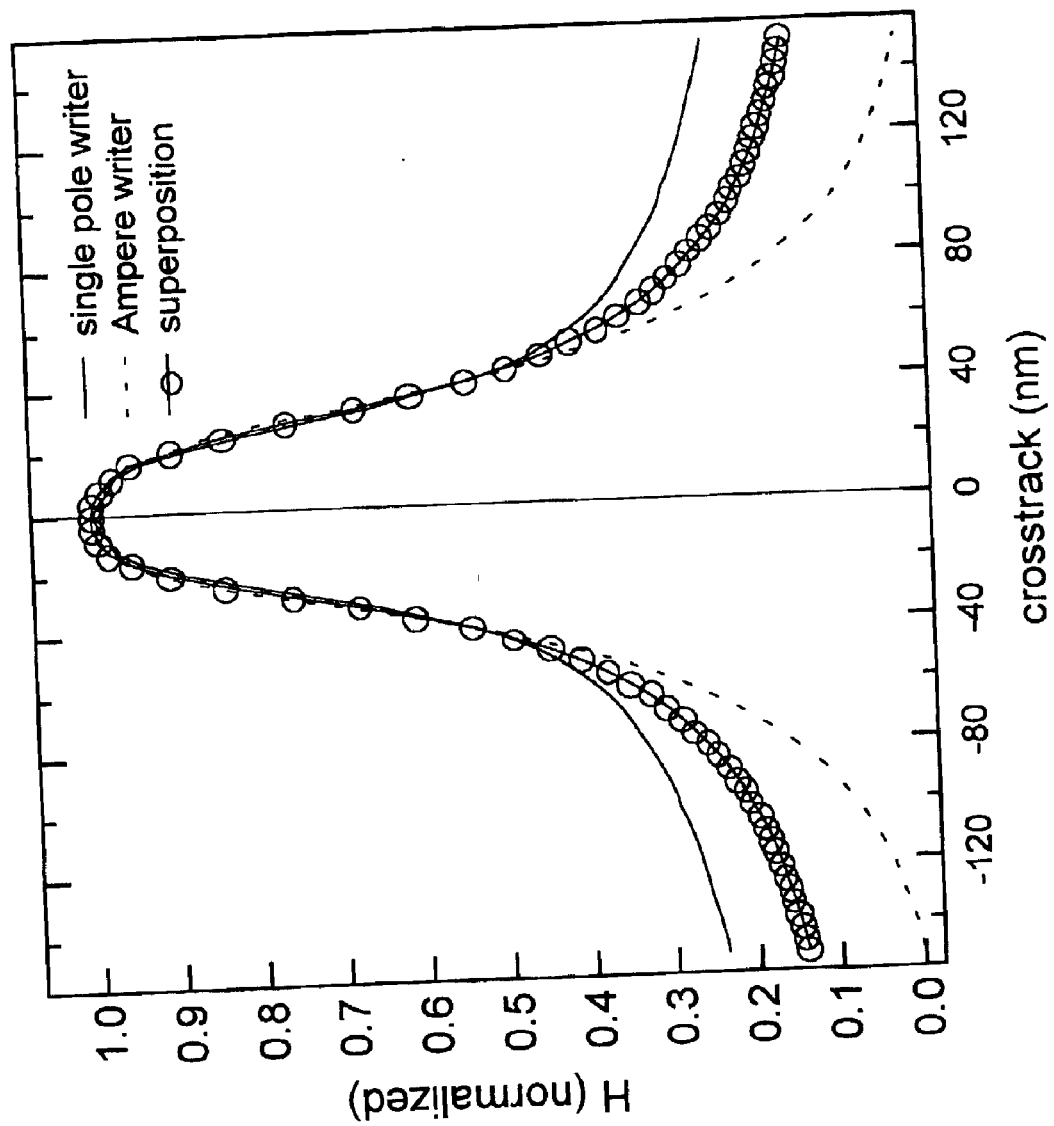
FIG. 7B is a graph of normalized magnetic field vs. crosstrack position for the head of FIG. 6A.

The profile of the integrated head 340 incorporating the contact geometry of the present invention has many desirable characteristics over that of the inductive writer, such as an increased field magnitude and trailing edge gradient, a shorter transition to zero trailing edge background field, and better spatial coincidence between the peak field position and the maximum gradient. FIG. 7A is a graph of magnetic field vs. crosstrack position and FIG. 7B is a graph of normalized magnetic field vs. crosstrack position for a single pole inductive head writer (graph 361), an ampere head writer (graph 363) and their superposition (graph 365). The crosstrack field profile is measured at the downtrack position corresponding to the interface between the wire and the single pole inductive writer. The normalized data show the crosstrack profile of the Ampere head 342 is actually sharper than that of the inductive writer 344. This demonstrates the effectiveness of the present invention in focusing the magnetic field. The strength of the magnetic field rapidly drops off in a direction away from the wire.

Figure 8A:
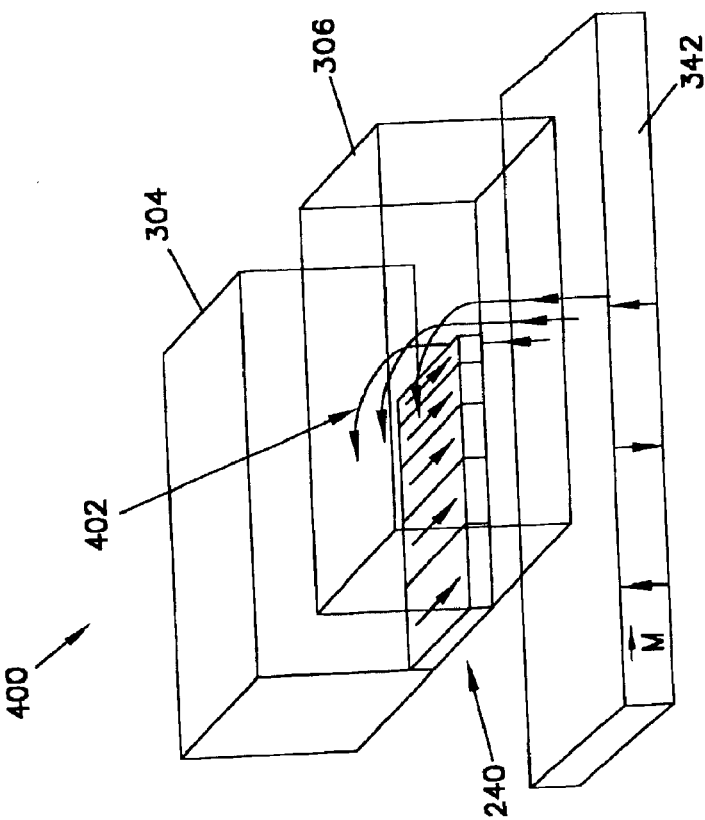
FIG. 8A is a bottom perspective view and FIG. 8B is a top perspective view of a magnetic head which includes a multi-layer thin film wire and contact geometry configured to focus the magnetic field from the head.
Figure 8B:
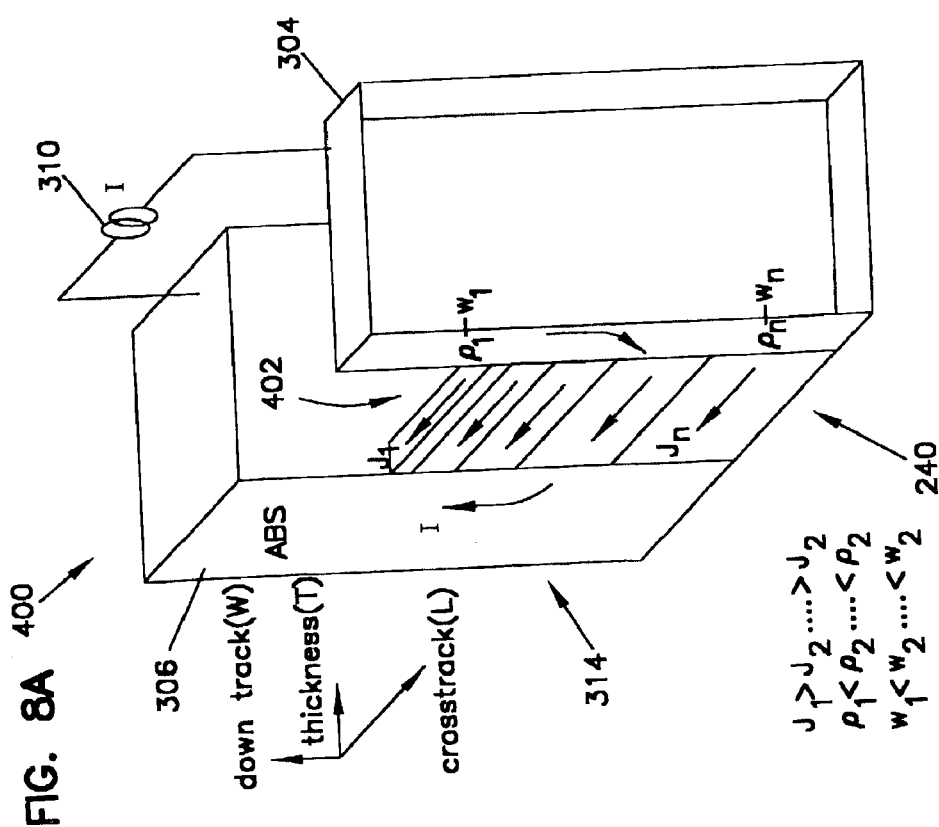

FIG. 8A is a bottom perspective view and FIG. 8B is a top perspective view of a magnetic head 400 which utilizes the contact geometry shown in FIGS. 5A and 5B and the multi-layer wire configuration shown in FIG. 3A to provide two mechanisms for focusing the magnetic field along a recording edge 402. Elements in FIGS. 8A and 8B which are similar to elements shown in FIGS. 3A, 5A and 5B have retained their numbers. In FIG. 5B contact 306 is shown in phantom so that the complete structure can be seen. The multilayer wire 240 has a current density gradient such that the largest current density is in the narrowest layer and the current density decreases in the direction away from this layer and is at a minimum in the n$^{th}$ layer, which is also the widest layer. Thus, the recording edge 402 is where both the multilayer wire 240 and the contact geometry focus the field. The invention can be used in other configurations or with other head geometries.

The present invention provides a current-density gradient across the width of a wire such that the resulting perpendicular magnetic field generated by the wire is focused to one edge, and the field at the other edge is significantly diminished. A low-complexity, practical device design is provided which uses a multilayer thin-film wire of width w (w set by total multilayer thickness) having each layer separately configured, by way of materials and geometry, to regulate the current through a given layer so as to induce the desired current-density gradient. A contact geometry is also provided that further enhances the focusing effect, whereby the wire is contacted and current is applied above the leading edge of the wire (focusing edge), along the downtrack direction. The invention provides many desirable features. The perpendicular field profile is appropriate for magnetic recording using a low complexity design that can be readily fabricated and manufactured with common, low complexity materials and processing techniques. The present invention provides field gradients and field magnitudes comparable to a single layer wire of much smaller total width carrying a comparable current. This provides a better current carrying capacity. In addition, the structure can be readily integrated with inductive writer designs with the net field having very favorable properties for magnetic recording.

In various aspects, the present invention includes a magnetic head 400 for generating a magnetic field for perpendicular recording. First and second electrical contacts 304 and 306 couple to a current source 310 which provides a current I through a thin film wire 240 of the head 400. A magnetic field focus mechanism focuses the magnetic flux and increases the flux density of a perpendicular magnetic recording field along a recording edge 402 of the head 400. The examples of the magnetic field focus mechanism include the use of multiple layers of wire 240 and the geometry of the contacts 304 and 306 relative to wire 240. In various aspects, the thin film wire is not coiled and/or generates a magnetic field which is applied directly to the storage medium, without the use of a separate core or pole structure required to receive and focus the magnetic field along a pole tip. Typical widths of the thin film would be of the order of 100 nm and smaller.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic head while maintaining substantially the same functionality without departing from the scope and spirit of the present invention. In addition, although the preferred embodiment described herein is directed to a disc storage system, it will be appreciated by those skilled in the art that the teachings of the present invention can be applied to a magnetic field storage system or system where a perpendicular magnetic field profile is desired, without departing from the scope and spirit of the present invention. In various aspects, the thin film wire 400 has a width of less than 100 nm and comprises Cu, Ag, Au, carbon nanotubes, or other materials.

What is claimed is:

1. A magnetic apparatus for generating a magnetic field for perpendicular magnetic recording, comprising:
    a first electrical contact configured to couple to an electrical current source having a modulated electrical current output;
    a second electrical contact configured to couple to the current source;
    a first thin film wire coupled between the first electrical contact and the second electrical contact to carry the modulated electrical current therebetween, and responsively generate a magnetic field along a recording edge of the first thin film wire; and a magnetic field focus mechanism configured to produce a magnetic field that is asymmetric around a center of the first thin film wire to increase flux density of the magnetic field along the recording edge of the first thin film wire.

2. The apparatus of claim 1 wherein the magnetic field focus mechanism causes the electrical current to have a current density which varies across a width of the first thin film wire and provides a region of increased current density to thereby increase density of magnetic flux proximate to the region of increased current density.

3. The apparatus of claim 1 wherein the first and second electrical contacts have ends which couple to the current source and the first thin film wire couples to the contacts at positions spaced apart from the ends.

4. The apparatus of claim 1 including a second thin film wire having a recording edge separated from the first thin film wire by a space.

5. The apparatus of claim 1 including a ferromagnetic material adjacent the thin film wire to augment the magnetic field.

6. The apparatus of claim 1 including an air bearing surface and wherein the first thin film wire is proximate the air bearing surface.

7. A magnetic disc storage system for storing information using perpendicular recording which includes the magnetic apparatus of claim 1.

8. An apparatus for generating a magnetic field comprising:
- a first electrical contact configured to couple to an electrical current source having a modulated electrical current output;
- a second electrical contact configured to couple to the current source;
- a thin film wire coupled between the first electrical contact and the second electrical contact to carry the modulated electrical current therebetween, and responsively generate a magnetic field along a recording edge of the thin film wire; and
- a magnetic field focus mechanism configured to increase flux density of the magnetic field along the recording edge of the thin film wire;
- wherein the magnetic field focus mechanism comprises the thin film wire formed by a plurality of thin film layers which extend in a direction perpendicular to a width of the thin film wire to provide the region of increased current density.

9. The apparatus of claim 8 wherein at least two of the plurality of thin film layers are configured to produce magnetic fields which add constructively along the recording edge and add destructively along a trailing edge.

10. The apparatus of claim 8 including a space between adjacent thin film layers.

11. The apparatus of claim 8 wherein at least two of the plurality of thin film layers have different resistances.

12. The apparatus of claim 8 wherein at least two of the plurality of thin film layers have different resistivities.

13. The apparatus of claim 8 wherein at least two of the thin film wires have different current densities.

14. The apparatus of claim 8 wherein at least two of the plurality of thin film layers have different widths.

15. A method for generating a magnetic field for perpendicular magnetic recording comprising:
- placing a first thin film wire proximate a recording medium;
- applying an electrical current between first and second electrical contacts and through the first thin film wire to thereby generate a magnetic recording field proximate the first thin film wire; and
- using the first and second electrical contacts to produce a magnetic field that is asymmetric around a center of the first thin film wire to focus the magnetic recording field along a recording edge of the first thin film wire.

16. The method of claim 15 further comprising providing a current density in the first thin film wire which varies across a width of the thin first film wire.

17. The method of claim 15 wherein using the first and second electrical contacts to produce a magnetic field comprises positioning ends of the first thin film wire on the first and second electrical contacts at positions to thereby increase flux density of the magnetic recording field along the recording edge of the thin film wire.

18. The method of claim 15 including a second thin film wire having a recording edge separated by a space from the first thin film wire.

19. The method of claim 15 including providing a ferromagnetic material adjacent the first thin film wire to augment the magnetic field.

20. A magnetic disc storage system which generates a perpendicular recording field for recording on a magnetic disk in accordance with the method of claim 15.

21. A method for generating a magnetic field comprising:
- placing a thin film wire proximate a recording medium;
- applying an electrical current between first and second electrical contacts and through the thin film wire to thereby generate a magnetic recording field proximate the thin film wire; and
- focusing the magnetic recording field along a recording edge of the thin film wire;
- wherein the thin film wire comprises a plurality of thin film layers which extend in a direction perpendicular to the width of the thin film wire to provide a region of increased current density.

22. The method of claim 21 wherein at least two of the plurality of thin film layers are configured to cause magnetic fields to add constructively along the recording edge and add destructively along a trailing edge.

23. The method of claim 21 including a space between adjacent thin film layers.

24. The method of claim 21 wherein at least two of the plurality of thin film layers have different resistances.

25. The method of claim 21 wherein at least two of the plurality of thin film layers have different resistivities.

26. The method of claim 21 wherein at least two of the thin film wires have different current densities.

27. The method of claim 21 wherein at least two of the plurality of thin film wires have different widths.

28. A magnetic head for generating a magnetic field for recording, comprising:
- a thin film wire coupled between first and second electrical contacts configured to generate a magnetic recording field along a recording edge of the thin film wire; and
- means for producing a magnetic field that is asymmetric around a center of the thin film wire to increase the magnetic field along the recording edge of the thin film wire.

* * * * *

UNITED STATES PATENT AND TRADEMARK OFFICE
CERTIFICATE OF CORRECTION

PATENT NO. : 6,917,493 B2 Page 1 of 1
APPLICATION NO. : 10/341975
DATED : July 12, 2005
INVENTOR(S) : Thomas W. Clinton, Jonathan D. Hannay and Michael A. Seigler It is certified that error appears in the above-identified patent and that said Letters Patent is hereby corrected as shown below:

Column 5, Line 18
"FIG. 3G" should read -- FIG. 3C --

Column 6, Line 41
"field-strength" should read -- field strength --

Figure 6C:
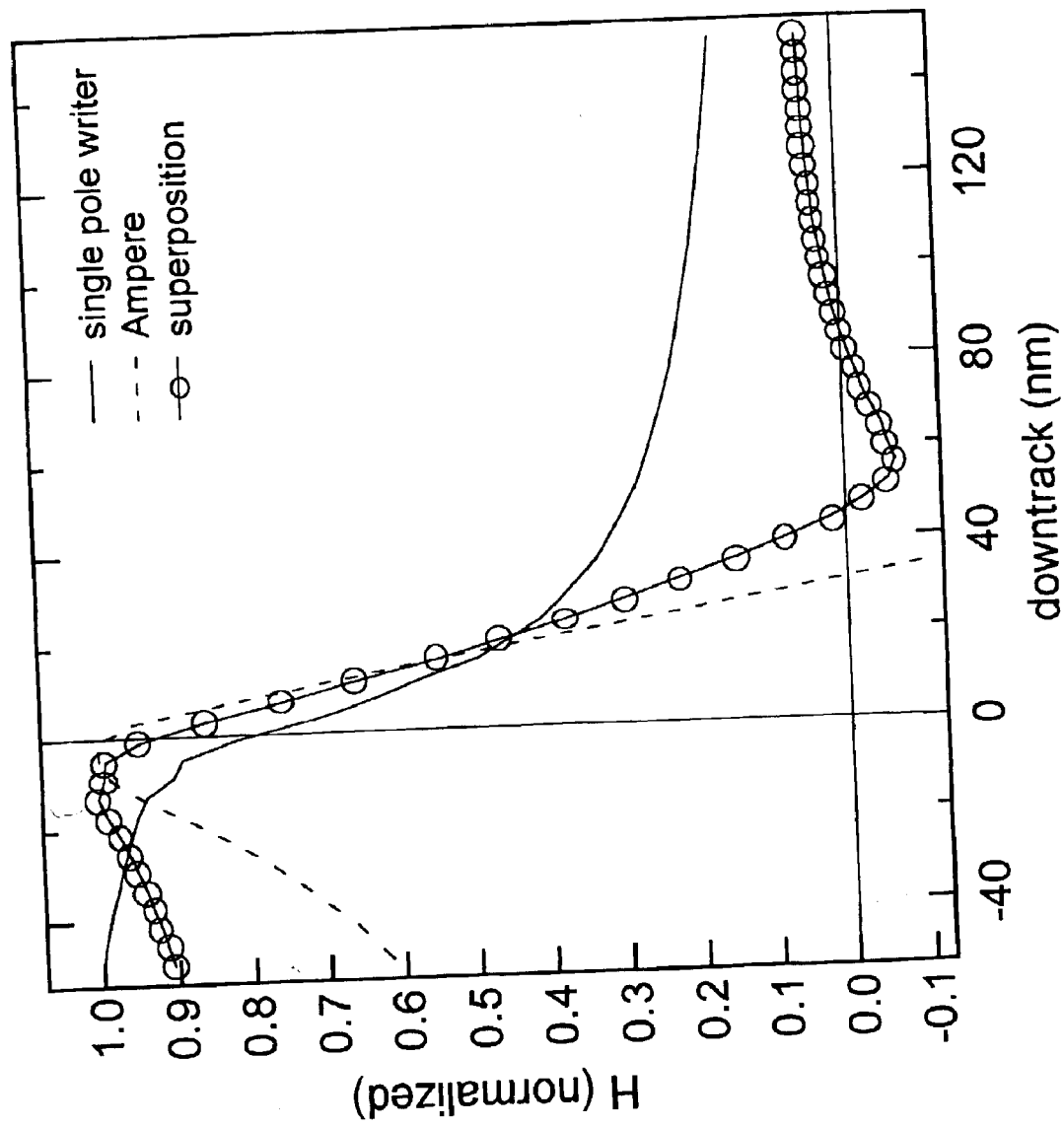
FIG. 6C is a graph of normalized magnetic field vs. downtrack position for the head of FIG. 6A.

Column 7, Line 6
"FIG. 6G" should read -- FIG. 6C --

Signed and Sealed this

Twenty-fifth Day of July, 2006

JON W. DUDAS
*Director of the United States Patent and Trademark Office*